United States Patent
Lindee et al.

(10) Patent No.: US 6,320,141 B1
(45) Date of Patent: *Nov. 20, 2001

(54) YIELD MONITORING SYSTEM FOR A SLICING APPARATUS

(75) Inventors: Scott Lindee; Steven Ill, both of Mokena, IL (US)

(73) Assignee: Formax, Inc., Mokena, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/416,445

(22) Filed: Oct. 12, 1999

(51) Int. Cl.[7] .......................... G01G 19/34; G01G 13/02
(52) U.S. Cl. ...................... 177/25.13; 177/116; 177/119
(58) Field of Search ...................... 177/25.19, 50, 177/116, 119, 1, 25.11, 25.12, 25.13, 25.15, 121

(56) References Cited

U.S. PATENT DOCUMENTS

| | | | |
|---|---|---|---|
| 3,846,958 | * 11/1974 | Divan | 177/119 |
| 3,905,259 | 9/1975 | Spooner | 177/120 |
| 3,995,517 | * 12/1976 | Smith | 177/119 |
| 4,038,531 | * 7/1977 | Loe, Jr. | 177/121 |
| 4,065,911 | * 1/1978 | Fagan | 177/119 |
| 4,136,504 | 1/1979 | Wyslotsky | 53/435 |
| 4,208,933 | 6/1980 | Skidmore | 83/367 |
| 4,379,416 | 4/1983 | Kuchler | 83/23 |
| 4,545,447 | * 10/1985 | Spooner et al. | 177/50 |
| 4,557,019 | 12/1985 | Van Devanter et al. | 17/52 |
| 4,763,738 | 8/1988 | Kuchler | 177/50 |
| 4,779,706 | * 10/1988 | Mergenthaler | 177/25.15 |
| 4,794,996 | * 1/1989 | Wallace et al. | 177/24.14 |
| 4,868,951 | * 9/1989 | Akesson et al. | 177/50 |
| 4,997,012 | * 3/1991 | Kuziw | 177/25.19 |
| 5,109,936 | * 5/1992 | Ruppel | 177/25.19 |
| 5,267,168 | 11/1993 | Antonissen et al. | 700/117 |
| 5,306,875 | * 4/1994 | Schmitzek | 177/25.15 |
| 5,481,466 | 1/1996 | Carey | 700/167 |
| 5,499,719 | 3/1996 | Lindee et al. | 209/703 |
| 5,608,193 | * 3/1997 | Almogaibil | 177/25.13 |
| 5,986,219 | * 11/1999 | Carrol et al. | 177/1 |

FOREIGN PATENT DOCUMENTS

| | | |
|---|---|---|
| 0 288 592 B1 | 8/1990 | (EP) . |
| 0 504 466 A1 | 9/1992 | (EP) . |
| 0 549 134 B1 | 5/1996 | (EP) . |
| 1507683 | 4/1978 | (GB) . |
| 2149650 | 8/1990 | (GB) . |
| WO 93/24287 | 12/1993 | (WO) . |

* cited by examiner

*Primary Examiner*—Randy W. Gibson
(74) *Attorney, Agent, or Firm*—Rockey, Milnamow & Katz, Ltd.

(57) ABSTRACT

The present invention provides a yield monitoring system for a slicing and packaging apparatus. In accordance with one embodiment of the system, the system includes at least one product input scale, a slicing mechanism for slicing the product after the product has been weighed on the at least one product input scale, and at least one product output scale capable of weighing the product after slicing by the slicing mechanism to determine a post-processing weight. A yield monitor is connected to electronically receive weight information corresponding to the weight of product weighed by the at least one product input scale and the at least one product output scale. The yield monitor uses the received weight information to provide system yield data to a user via a screen, print-out, electronic data, etc.. Preferably, the system also includes a makeweight scale that is disposed at a makeweight station. The makeweight scale is connected to electronically communicate makeweight data to the yield monitor.

34 Claims, 3 Drawing Sheets

FIG. 2

YIELD MONITOR 40

| Value | Label | | Value | Label |
|---|---|---|---|---|
| 292.16 | TOTAL (LBS) IN | | 93.32% | YIELD (%) |
| 5 | TOTAL IN CNT | | 2.05% | TOTAL GA (%) |
| 2.65 | MAKE WGT (LBS) | | 5.60 | TOTAL GA (LBS) |
| 3 | MAKE WGT CNT | | 1.00% | ODD SHAPE SL.(%) |
| 278.24 | TOTAL (LBS) OUT | | 2.91 | ODD SHAPE SL.(LBS) |
| 272.64 | TOTAL TRGT(LBS)OUT | | 3.63% | END/PCS/INED.(%) |
| #1: 2.70%<br>#2: 0.75% | MACHINE GA (%) | | 11.01 | END/PCS/INED.(LBS) |
| 56.06% | MAKE WGT GA (%) | | 0.00%<br>0.00 | GRADED REJECTS (%)<br>GRADED REJECTS(LBS) |

SCALE STATUS
MAKE WGHT: CONNECTED
TOTAL IN: CONNECTED

[SUBTRACT GRADED REJECTS] [SUBTRACT UNSLICED WEIGHT] [RETURN]

FIG. 3

| Value | Label | | Value | Label |
|---|---|---|---|---|
| 0 | # STACKS | | 0.00 OZ | AVERAGE ACCEPTED WEIGHT |
| 0 | # ACCEPTED | | 0.0 % | % ACCEPTED |
| 0 | # REJECTED | | 0.0 % | % REJECTED |
| 0 | # SEAMS | | 0.00% | % MACHINE GIVEAWAY |
| 0 | # LOAVES | | 0.0 LBS | ACCEPTED WEIGHT |
| 0.000 | PRODUCTION HOURS | | 0.0 LBS | OFF WEIGHT |
| 1860 | PRODUCTION RATE LB/HR | | 0.1250 IN | AVERAGE SLICE THICKNESS |
| | | | 0.1312 IN | SEAM CORRECT THICKNESS |

40

| CLEAR DATA | MORE | MACHINE ADJUSTMENTS | PRINT PRODUCTION DATA | MAIN MENU |

YIELD MONITORING SYSTEM FOR A SLICING APPARATUS

BACKGROUND OF THE INVENTION

The invention relates to apparatus for processing and packaging products, and specifically to a yield monitoring system in apparatus for slicing and/or packaging foodstuffs.

The ever-accelerating pace of modern life has caused consumers increasingly to rely upon pre-packaged food products. In order to meet consumer expectations and other requirements, modern food processing and packaging systems are geared toward providing products that are consistent in size, weight, and appearance. An example of such systems may be seen in U.S. Pat. No. 5,109,936 to Ruppel. This known system includes a slicing machine having a slicing blade and a feed mechanism, and uses feedback from primary and secondary weighing systems to control slice thickness. Another example may be seen in U.S. Pat. No. 3,846,958 to Divan. In this system, out-of-tolerance drafts are diverted to another location in order that an attendant may add or subtract product to make proper weight. Each of these patents is incorporated by reference herein. Common to all such systems is the fact that food products leaving the slicer are evaluated for weight, density, etc., and then slices of product are either adjusted, added, or taken away to achieve uniformity.

Such consistency does not, however, come without a price. Since foodstuffs such as meat naturally vary in shape, density, etc., the production of packaged foods having a predetermined, uniform size, weight, and shape increases the potential for waste. End pieces, irregularly shaped drafts, and other natural non-uniformities present costly reductions in overall product yield. That is, the amount of product input into the packaging system may greatly exceed the amount of packaged product output.

It has previously been proposed that excess product be reintroduced into the system to supplement drafts that are underweight. One example of such a "makeweight" component is set forth in U.S. Pat. No. 5,499,719 to Lindee et al., which is hereby incorporated by reference herein. In order to minimize waste, this system corrects any out-of-tolerance or "reject" food product groups. The corrected groups of food slices or other food products can then be put into the stream of originally correct groups and sent on to a packaging location or other utilization position.

Undoubtedly, such makeweight arrangements increase the overall efficiency of the food product processing systems. However, while the above-described systems present various approaches to quantifying the uniformity of the packaged product, they fail to address the quantification of system efficiency, i.e., system yield.

The present inventors have recognized that a need exists for an automated system to determine and monitor the overall system yield of a food processing system. Typically, all companies that calculate system yield first calculate the "weight in" of the material to be sliced. This is generally done by weighing each rack of meet on a floor scale, subtracting the weight of the rack itself, then stripping the casing and weighing that is well. This is then subtracted from the initial weight measurement to arrive at the requisite "weight in".

BRIEF SUMMARY OF THE INVENTION

The present invention provides a yield monitoring system for a slicing and packaging apparatus. In accordance with one embodiment of the system, the system includes at least one product input scale, a slicing mechanism for slicing the product after the product has been weighed on the at least one product input scale, and at least one product output scale capable of weighing the product after slicing by the slicing mechanism to determine a post-processing weight. A yield monitor is connected to electronically receive weight information corresponding to the weight of product weighed by the at least one product input scale and the at least one product output scale. The yield monitor uses the received weight information to provide system yield data to a user via a screen, print-out, electronic data, etc. Preferably, the system also includes a makeweight scale that is disposed at a makeweight station. The makeweight scale is connected to electronically communicate makeweight data to the yield monitor.

BRIEF DESCRIPTION OF THE SEVERAL VIEWS OF THE DRAWINGS

FIG. 2 is an illustration of a display screen showing output from a yield monitoring system.

FIG. 3 is an illustration of a display screen showing output from a yield monitoring system.

DETAILED DESCRIPTION OF THE INVENTION

Figure 1:
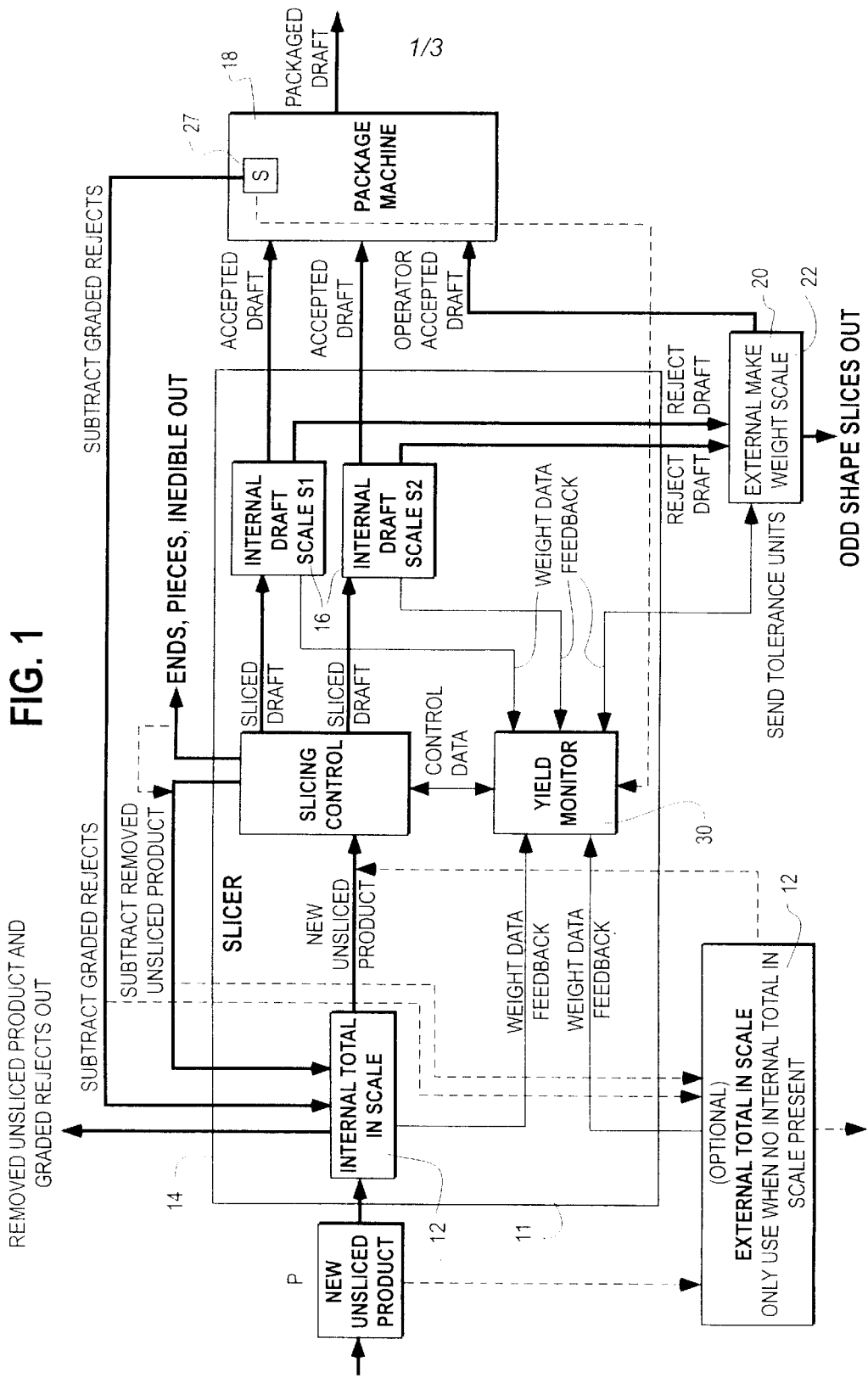
FIG. 1 is a schematic view of a slicing and packaging system.

FIG. 1 schematically illustrates a slicing and packaging system 10. Generally stated, the slicing and packaging system 10 includes a slicing machine, shown generally at 14, and a packaging machine, shown generally at 18. Preferably, the slicing machine 14 is a slicer such as one available from Formax, Inc., of Mokena, Ill. More particularly, the slicing machine 11 is preferably one sold under the trademark S180®. The preferred Formax slicing machine includes an internal main product scale 12 (for measuring the total weight of the product provided to the slicing machine 14) and at least one internal draft scale 16 (for measuring the weight of each draft sliced by the slicing machine 14). Such a slicing machine also includes an automated slicing control unit 15 that, for example, is based on a CPU, microprocessor, microcontroller, or the like. The slicing control unit 15 is connected to receive weight data from internal scale 12 as well as from the one or more internal draft scales 16. In normal operation, weight measurements received from the internal draft scales 16 are used by the slicing control unit 15 to adjust the feeding of the product to the slicing blades of the machine 11 so that the drafts provided by the slicing machine 11 are within a predetermined weight range. For purposes of the presently disclosed yield monitor system, an external scale 12' may be employed in those instances in which the slicing machine 14 does not include an internal main scale 12.

A yield monitor 30 is connected to receive electronically transmitted weight data from a plurality of scales. More particularly, as implemented in the illustrated embodiment, the yield monitor 30 is connected to the internal main scale 12, the slicing mechanism's internal draft scale 16, a makeweight scale 22 (the operation of which will be described in further detail below), and a graded reject scale 27. The yield monitor 30 is capable of receiving, storing, and manipulating information received from the plurality of scales to provide data concerning the overall yield of the slicing and packaging system 10. To this end, the yield monitor 30 may receive signals, such as analog and/or digital data signals, representing weights from the internal main scale 12, the slicing mechanism's internal draft scale 16, and the makeweight scale 22. This data may be used by the yield monitor 30 to compare weight these values to one another, compare the weight values to stored data, or combine the weight values with stored data for executing further comparisons. In the disclosed embodiment, the weight data values for the internal main scale 12 and internal draft scale 16 are provided indirectly to the yield monitor 30 by way of the slicing control unit 15. However, it will be readily recognized that weight data can be provided to the yield monitor 30 either directly, as in the case of the makeweight scale 22, or indirectly through intermediate data channels.

In the present embodiment, the yield monitor 30 is in the form of a programmable control system based on a microprocessor, programmable logic controller, or microcontroller. A user interface is also provided in the form of an associated I/O unit, such as a touch display, separate keyboard and display, etc.. As shown, the yield monitor 30 employs a touch display 40 (FIGS. 2 and 3) that allows the operator to input system commands as well as select data for display.

In the slicing and packaging system 10, product P (which may be new product, previously processed product, or a combination thereof) is first weighed on the main internal scale 12. The measured weight data is then communicated to the slicing control unit 15 for further communication to the yield monitor 30. From the input scale 12, the product P is introduced into a subtractive processing station, such as a slicing mechanism 14. As noted above, the slicing mechanism 14 preferably includes one or more internal scales 16, that weigh each unit of sliced product (also referenced as a "draft" or "weighment") as it exits the slicer. If the draft falls within acceptable target weight criteria, it is then conveyed to a packaging mechanism 18. The measured weight is automatically communicated to a yield monitor 30 for use in calculating the system yield, as explained in further detail below. Communication of the weight information may take place irrespective of whether the draft falls within acceptable target weight criteria, depending on the programming of the yield monitor 30. Alternatively, drafts falling outside the acceptable target weight range may be ignored and not communicated to the yield monitor 30 at this point in favor of the provision of the total weight after adjustment at the makeweight station 20.

If the sliced product falls outside of acceptable target weight criteria, it is conveyed to a makeweight station 20. At the makeweight station 20, a makeweight operator either adds or subtracts product to or from the draft to bring it within acceptable target weight criteria. A makeweight scale 22 is provided at the makeweight station 20. The operator may use the makeweight scale 22 to weigh the amount of product added or subtracted from the draft, the result of which may be electronically communicated to the yield monitor 30. Alternatively, the weight of the entire corrected draft may be communicated to the yield monitor 30. Corrected drafts are then conveyed from the makeweight station 20 to the packaging mechanism 18, which wraps or otherwise encloses the drafts it receives from both the slicing mechanism 14 and the makeweight station 20 to output finished, packaged product 24. In the event the finished packaged product 24 is not acceptable, the graded rejects can be re-introduced to the input scale 12 and graded product can be accounted for by the yield monitor 30.

As a further optional enhancement, the system yield data may be enhanced by subtracting the weight value of graded rejects. To this end, graded reject scale 27 may provide graded reject weight data directly to the yield monitor 30. Alternatively, graded rejects may be conveyed for measurement at product input scale 12 that, in turn, either directly or indirectly provides such data to the yield monitor 30.

Still further, unsliced product that is removed from the slicing machine 11 can be optionally taken into account through the provision of a separate scale. However, such information is preferably provided by taking such weight measurements at the product input scale 12. The weight of removed unsliced product can then be electronically communicated, either directly or indirectly, to yield monitor 30 that, in turn, may be programmed to take such data into consideration when calculating system yield data.

FIGS. 2 and 3 represent exemplary operator screens 32 and 34, implemented on a touch screen, that may be displayed by the yield monitor 30. The data displayed on these screens are exemplary of some of the possible yield data that may be obtained from the yield monitor 30. Such yield data may additionally, or alternatively, be provided to a user in the form of a written printout, encoded data that is supplied to another processing system, etc.. These exemplary data types are described in the following table:

TABLE I

| DATA TERM | DESCRIPTION |
| --- | --- |
| Total In | Accumulated total weight of product input via primary input scale 12 |
| Total In Cnt | Number of weighments presented to the primary input scale 12 |
| Make Wgt | Accumulated total weight of product input to the makeweight scale 22 |
| Make Wgt Cnt | Number of weighments presented to the makeweight scale 22 |
| Total (lbs) Out | Total product weight that was output by the slicing mechanism 14 as acceptable drafts plus the total weight put back in line by the makeweight operator via the makeweight scale 22 |
| Total Tgt (lbs) Out | Total weight output based on the set target weight for each draft plus the total weight put back in line by the makeweight operator via the makeweight scale 22 |
| Machine GA (%) | The amount of product percentage the slicing mechanism 14 has "given away", i.e., the amount of weight that is over or under the expected set target weight of each draft through the slicing mechanism 14 |
| Make Wgt GA (%) | The amount of product percentage the makeweight operator has "given away", i.e., the amount of weight that is over or under the expected set target weight of each draft through the makeweight scale 22 |
| Yield (%) | The amount yielded or produced based on the total product input (Total In) versus the actual target weight and makeweight total (Make Wgt) output for a given production run |
| Total GA (%) | The amount of product (in percentage units) the slicing mechanism 14 and makeweight scale 22 have "given away", i.e., the percentage amount over or under the expected target weight of each draft |
| Total GA (lbs) | The amount of product (by measured weight) the slicing mechanism 14 and makeweight scale 22 have "given away", i.e., the amount of weight over or under the expected target weight of each draft |

As can be seen from the exemplary data in TABLE I, a system operator can use data generated by the yield monitor 30 to see when overall system yield falls below acceptable levels, and also to pinpoint the specific sources of waste and inefficiency. For example, if the yield monitor should indicate that the yield percentage is below acceptable levels, the operator can review the specific giveaway figures for the various system inputs to determine which of the waste figures is excessive. Further, the operator may control how the yield monitor 30 views certain data. To this end, the operator may direct the yield monitor 30 to receive weight data provided by product input scale 12 as either graded rejects or unsliced product weight.

The disclosed system has numerous advantages over existing methods used to calculate system yield data. For example, known systems require manual recordation and tracking of the weights needed to calculate system yield. The existing methods can thus be labor intensive and subject to substantial input errors. In contrast, system all of the present invention is convenient, hygienic, and provides for labor savings.

Labor savings, hygiene, and convenience are particularly present in the embodiment disclosed above in which the initial product input scale is integrated into the slicing machine itself. In this improved system, the "weight in" procedure is virtually transparent when compared to known "weight in" procedures. In such known procedures, the "weight in" procedure starts by weighing each rack of comestible product on a floor scale, subtracting out the weight of the rack itself, then stripping the casing and weighing that as well. The casing weight is also subtracted, thus giving the "weight in" of the material to be sliced. This is in stark contrast with the convenient "weight in" procedure associated with the integrated initial product scale embodiment of the present invention.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

What is claimed is:

1. In a system for processing a product, a method for monitoring product yield comprising the steps of:

taking measurements of the weight of all product that is to be processed;

processing the product;

taking measurements of the weight of all product that has been acceptably processed;

electronically communicating the weight measurements to a central yield monitor;

calculating yield data based upon a comparison of the electronically communicated weight measurements in a yield monitor;

providing the calculated yield data to a user.

2. A method as claimed in claim 1 wherein the step of providing the calculated yield data to a user is further defined by displaying the calculated yield data on a screen.

3. A method as claimed in claim 1 wherein the product is a comestible and the step of processing the product takes place on a slicing machine for comestibles.

4. In a system for slicing and packaging a comestible product, a method for monitoring system yield comprising the steps of:

providing an automated yield monitor;

providing a comestible loaf to an input scale to determine the weight thereof;

slicing the comestible loaf to form a plurality of product slices in the form of at least one comestible draft;

weighing the comestible draft to determine whether the draft is within a predetermined weight range;

electronically communicating the weight of the comestible draft to the automated yield monitor;

forwarding the comestible draft to a makeweight station if the draft is not within the predetermined weight range;

adding or subtracting slices of the comestible product to or from the comestible draft at the makeweight station to bring the draft within the predetermined weight range;

electronically communicating the weight of the comestible product added to or subtracted from the draft at the makeweight station to the automated yield monitor;

calculating yield data based upon a comparison of the electronically communicated weight measurements in the automated yield monitor;

providing the calculated yield data to a user;

forwarding the at least one comestible draft to an input of a packaging machine.

5. In a system for slicing and packaging a comestible product, a method for monitoring system yield comprising the steps of:

providing an automated yield monitor;

providing a comestible loaf to an input scale to determine the weight thereof;

slicing the comestible loaf to form a plurality of product slices in the form of at least one comestible draft;

weighing the comestible draft to determine whether the draft is within a predetermined weight range;

electronically communicating the weight of the comestible draft to the automated yield monitor;

forwarding the draft to a makeweight station if the draft is not within the predetermined weight range;

adding or subtracting slices of the comestible product to or from the comestible draft at the makeweight station to bring the draft within the predetermined weight range;

electronically communicating the weight of the corrected draft from the makeweight station;

calculating yield data based upon a comparison of the electronically communicated weight measurements in the automated yield monitor;

providing the calculated yield data to a user;

forwarding the at least one comestible draft to an input of a packaging machine.

6. An apparatus for use in a system for slicing a comestible product comprising:

at least one product input scale;

a slicing mechanism for slicing the comestible product after the product has been weighed on the at least one product input scale;

at least one product output scale capable of weighing the product after slicing by the slicing mechanism to determine a post-processing weight; and a yield monitor connected to electronically receive weight information corresponding to weight data obtained by the at least one product input scale and the at least one product output scale, the yield monitor using the received weight information to provide system yield data to a user.

7. An apparatus as claimed in claim 6 and further comprising a makeweight scale connected to electronically communicate makeweight data to the yield monitor.

8. An apparatus as claimed in claim 6 wherein the yield monitor provides system yield data to a user on a visual display.

9. An apparatus as claimed in claim 6 wherein the yield monitor provides system yield data to a user on a print-out.

10. An apparatus as claimed in claim 6 wherein the at least one product input scale is disposed in the slicing mechanism.

11. An apparatus according to claim 6 wherein the at least one product output scale is disposed in the slicing mechanism.

12. An apparatus according to claim 10 wherein the at least one product output scale is disposed in the slicing mechanism.

13. An apparatus according to claim 6 wherein the yield monitor is disposed in the slicing mechanism.

14. An apparatus as claimed in claim 12 wherein the yield monitor is disposed in the slicing mechanism.

15. An apparatus as claimed in claim 14 wherein the slicing mechanism comprises a slicing control system connected to receive electronic weight data from the at least one product input scale and the at least one product output scale, the yield monitor being connected to receive electronic weight data corresponding to the at least one product input scale and the at least one product output scale via the slicing control system.

16. An apparatus as claimed in claim 6 and further comprising a scale for electronically communicating weight of graded rejects for use by the yield monitor.

17. An apparatus as claimed in claim 6 and further comprising a scale for electronically communicating weight of unsliced product removed from the slicing machine for use by the yield monitor.

18. An apparatus as claimed in claim 16 wherein the scale for electronically communicating weight of graded rejects is the at least one product input scale.

19. An apparatus as claimed in claim 17 wherein the scale for electronically communicating weight of unsliced product removed from the system is the at least one product input scale.

20. An apparatus for use in a system for slicing a comestible product comprising:
   at least one product input scale;
   a slicing mechanism for slicing the comestible product after the product has been weighed on the at least one product input scale;
   at least one product output scale capable of weighing the product after slicing by the slicing mechanism to determine a post-processing weight;
   at least one product makeweight scale capable of electronically communicating makeweight data; and
   a yield monitor connected to electronically receive weight information from the at least one product input scale, the at least one product output scale, and be at least one product makeweight scale, the yield monitor using the received weight information to provide system yield data to a user.

21. An apparatus as claimed in claim 20 wherein makeweight scale electronically communicates weight data correspond to an entire draft corrected at a makeweight station.

22. An apparatus as claimed in claim 20 wherein makeweight scale electronically communicates weight data correspond to a weight of slices added to or subtracted from a draft to bring the draft within a predetermined weight range while at a makeweight station.

23. An apparatus as claimed in claim 20 wherein the yield monitor provides system yield data to a user on a visual display.

24. An apparatus as claimed in claim 20 wherein the yield monitor provides system yield data to a user on a print-out.

25. An apparatus as claimed in claim 20 wherein the at least one product input scale is disposed in the slicing mechanism.

26. An apparatus according to claim 20 wherein the at least one product output scale is disposed in the slicing mechanism.

27. An apparatus according to claim 26 wherein the at least one product output scale is disposed in the slicing mechanism.

28. An apparatus according to claim 20 wherein the yield monitor is disposed in the slicing mechanism.

29. An apparatus as claimed in claim 27 wherein the yield monitor is disposed in the slicing mechanism.

30. An apparatus as claimed in claim 29 wherein the slicing mechanism comprises a slicing control system connected to receive electronic weight data from the at least one product input scale and the at least one product output scale, the yield monitor being connected to receive electronic weight data corresponding to the at least one product input scale and the at least one product output scale via the slicing control system.

31. An apparatus as claimed in claim ref claim 20 and further comprising a scale for electronically communicating weight of graded rejects for use by the yield monitor.

32. An apparatus as claimed in claim 20 and further comprising a scale for electronically communicating weight of unsliced product removed from the slicing machine for use by the yield monitor.

33. An apparatus as claimed in claim 31 wherein the scale for electronically communicating weight of graded rejects is the at least one product input scale.

34. An apparatus as claimed in claim 32 wherein the scale for electronically communicating weight of unsliced product removed from the system is the at least one product input scale.

* * * * *

UNITED STATES PATENT AND TRADEMARK OFFICE
CERTIFICATE OF CORRECTION

PATENT NO. : 6,320,141 B1
DATED : November 20, 2001
INVENTOR(S) : Scott Lindee and Steven Ill It is certified that error appears in the above-identified patent and that said Letters Patent is hereby corrected as shown below:

<u>Title page,</u>
Item [56], References Cited, U.S. PATENT DOCUMENTS, add patent -- 6,215,078-A 4/2001 Torres………..177/25.15 --.
Item [56], FOREIGN PATENT DOCUMENTS, add -- WO 89/08933 10/1989 (WO) --.

<u>Column 1,</u>
Line 59, cancel "meet" and substitute -- meat --.

<u>Column 3,</u>
Line 4, cancel "weight these" and substitute -- these weight --.

<u>Column 5,</u>
Line 13, cancel "system all" and substitute -- the system --.

<u>Column 7,</u>
Line 54, cancel "be" and substitute -- the --.

Signed and Sealed this

Thirteenth Day of August, 2002

Attest:

Attesting Officer

JAMES E. ROGAN
*Director of the United States Patent and Trademark Office*